United States Patent [19]

Modrek et al.

[11] Patent Number: 5,076,974
[45] Date of Patent: Dec. 31, 1991

[54] METHODS OF CURING PARTIALLY POLYMERIZED PARTS

[75] Inventors: Borzo Modrek, Azusa; Brent Parker, Newhall; Stuart T. Spence, S. Pasadena, all of Calif.

[73] Assignee: 3 D Systems, Inc., Valencia, Calif.

[21] Appl. No.: 268,429

[22] Filed: Nov. 8, 1988

Related U.S. Application Data

[63] Continuation-in-part of Ser. No. 183,016, Apr. 18, 1988, Pat. No. 4,996,010.

[51] Int. Cl.$^5$ .............................................. B29C 35/08
[52] U.S. Cl. ...................................... 264/22; 264/232; 264/236; 264/340; 264/347; 427/53.1; 427/54.1; 522/910
[58] Field of Search ................... 264/22, 86, 234, 236, 264/344, 345, 347, 232, 340; 425/84, 174.4, 404, 445; 34/9, 12, 42, 89.1, 95, 243 R; 427/54.1, 53.1, 393.5; 250/432 R, 492.1; 430/327, 328, 394, 396; 522/910

[56] References Cited

U.S. PATENT DOCUMENTS

| | | | |
|---|---|---|---|
| 2,395,675 | 2/1946 | Luth | 264/347 X |
| 3,723,120 | 3/1973 | Hummel | 430/327 |
| 3,842,515 | 10/1974 | MacDonald et al. | 34/9 |
| 4,364,879 | 12/1982 | Gut et al. | 264/22 |
| 4,575,330 | 3/1986 | Hull | 425/174.4 |
| 4,603,058 | 7/1986 | Adams | 427/54.1 |
| 4,814,119 | 3/1989 | Scholz | 264/22 |

OTHER PUBLICATIONS

Herbert, A. J. "Solid Object Generation", Journal of Applied Photographic Engineering, vol. 8, No. 4 (Aug. 1982), pp. 185–188.

Primary Examiner—Leo B. Tentoni
Attorney, Agent, or Firm—Lyon & Lyon

[57] ABSTRACT

An improved stereolithography system and method for curing a stereolithographically-produced part, including at least some material that is no more than partially transformed, by exposing the part to off-peak-absorptive wavelengths of synergistic stimulation to achieve a more uniform cure.

14 Claims, 9 Drawing Sheets

METHODS OF CURING PARTIALLY POLYMERIZED PARTS

CROSS REFERENCE TO RELATED APPLICATIONS

This application is a continuation-in-part of U.S. patent application Ser. No. 183,016, filed Apr. 18, 1988, now U.S. Pat. No. 4,996,010. Related applications filed concurrently on that date are U.S. patent application Ser. Nos. 182,823; 182,830; 183,015; 182,801; 183,014; and 183,012, all of which are hereby fully incorporated herein by reference. Continuations-in-part of U.S. patent application Ser. Nos. 182,830; 183,014; and 183,012, are being concurrently filed herewith, all of which are hereby fully incorporated herein by reference. The U.S. patent application Ser. Nos. for the aforementioned continuations-in-part are 268,816, 268,837, 268,907, and 269,801 (all for Ser. No. 182,830).

BACKGROUND OF THE INVENTION

Field of the Invention

This invention relates generally to improvements in methods and apparatus for forming three-dimensional objects from a fluid medium and, more particularly, to new and improved stereolithography systems involving the application of enhanced data manipulation and lithographic techniques to production of three-dimensional objects, whereby such objects can be formed more rapidly, reliably, accurately and economically.

It is common practice in the production of plastic parts and the like to first design such a part and then painstakingly produce a prototype of the part, all involving considerable time, effort and expense. The design is then reviewed and, often times, the laborious process is again and again repeated until the design has been optimized. After design optimization, the next step is production. Most production plastic parts are injection molded. Since the design time and tooling costs are very high, plastic parts are usually only practical in high volume production. While other processes are available for the production of plastic parts, including direct machine work, vacuum-forming and direct forming, such methods are typically only cost effective for short run production, and the parts produced are usually inferior in quality to molded parts.

Very sophisticated techniques have been developed in the past for generating three-dimensional objects within a fluid medium which is selectively cured by beams of radiation brought to selective focus at prescribed intersection points within the three-dimensional volume of the fluid medium. Typical of such three-dimensional systems are those described in U.S. Pat. Nos. 4,041,476; 4,078,229; 4,238,840 and 4,288,861. All of these systems rely upon the buildup of synergistic energization at selected points deep within the fluid volume, to the exclusion of all other points in the fluid volume. Unfortunately, however, such three-dimensional forming systems face a number of problems with regard to resolution and exposure control. The loss of radiation intensity and image forming resolution of the focused spots as the intersections move deeper into the fluid medium create rather obvious complex control situations. Absorption, diffusion, dispersion and diffraction all contribute to the difficulties of working deep within the fluid medium on an economical and reliable basis.

In recent years, "stereolithography" systems, such as those described in U.S. Pat. No. 4,575,330 entitled "Apparatus For Production of Three-Dimensional Objects by Stereolithography," have come into use. Basically, stereolithography is a method for automatically building complex plastic parts by successively printing cross-sections of photopolymer (such as liquid plastic) on top of each other until all of the thin layers are joined together to form a whole part. With this technology, the parts are literally grown in a vat of liquid plastic. This method of fabrication is extremely powerful for quickly reducing design ideas to physical form and for making prototypes.

Photocurable polymers change from liquid to solid in the presence of light and their photospeed with ultraviolet light (UV) is fast enough to make them practical model building materials. The material that is not polymerized when a part is made is still usable and remains in the vat as successive parts are made. An ultraviolet laser generates a small intense spot of UV. This spot is moved across the liquid surface with a galvanometer mirror X-Y scanner. The scanner is driven by computer generated vectors or the like. After each successive surface is contacted by the laser, an elevator causes another layer of fresh liquid surface to be presented thereto for polymerization. Precise complex patterns can be rapidly produced with this technique.

The laser, scanner, photopolymer vat and elevator, along with a controlling computer, combine together to form a stereolithography apparatus, referred to as "SLA". An SLA is programmed to automatically make a plastic part by drawing its cross section one layer at a time, and building it up layer by layer.

Stereolithography represents an unprecedented way to quickly make complex or simple parts without tooling. Since this technology depends on using a computer to generate its cross sectional patterns, there is a natural data link to CAD/CAM. However, such systems have encountered difficulties relating to shrinkage, curl and other distortions, as well as resolution, accuracy and difficulties in producing certain object shapes.

When objects come out of the vat of resin, after being drawn, they are in the "green state," partially polymerized. Objects are then post cured to complete the polymerization process. This post curing can be done in two ways: 1) by thermal curing, or 2) by flood UV curing. This invention reduces the distortion of objects when they are post cured using a UV flood exposure. It also reduces the required UV exposure level and/or cure time.

In a first approach, the part is flood UV cured only. The disadvantage of this procedure is that objects may distort. In a second approach an effort is made to control parameters involved in the flood UV curing process, to control UV intensity and part temperature. The disadvantage of this approach is that, in general, parts have a wide variety of differing shapes, such that maintaining an ideal particular temperature and exposure level is difficult. This procedure is also time consuming.

Hence, there continues to be long existing need in the design and production arts for enhanced capability in rapidly and reliably moving from the design stage to the prototype stage and to ultimate production, particularly moving directly from the computer designs for such plastic parts to virtually immediate prototypes and the facility for large scale production on an economical and automatic basis.

Accordingly, those concerned with the development and production of three-dimensional plastic objects and the like have long recognized the desirability for further improvement in more rapid, reliable, economical and automatic means which would facilitate quickly moving from a design stage to the prototype stage and to production, while avoiding the complicated post processing problems of the prior art three-dimensional production systems. The present invention clearly fulfills all of these needs.

SUMMARY OF THE INVENTION

The present invention is directed to a method for curing a partially polymerized, stereolithographically produced part, comprising the steps of immersing the part in a liquid medium, and providing means for curing said part while it is immersed in said liquid medium.

An important object of this invention is to provide a means for curing a partially polymerized, stereolithographically produced part which removes heat from the part as it cures and thereby reduces risk of part warpage or distortion.

Another important object of this invention is to provide a means for curing a partially polymerized, stereolithographically produced part which displaces oxygen from the surface of said part, thereby providing a more complete, high quality and efficient cure at the surface.

The above and other objects and advantages of this invention will be apparent from the following more detailed description when taken in conjunction with the accompanying drawings of illustrative embodiments.

DETAILED DESCRIPTION OF THE PREFERRED EMBODIMENTS

Figure 1:
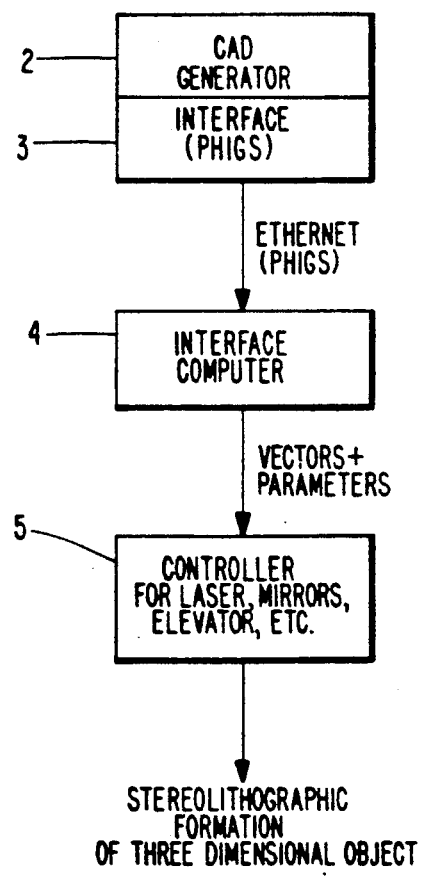
FIG. 1 is an overall block diagram of a stereolithography system for the practice of the present invention.

Briefly, and in general terms, the present invention relates to aspects of a new and improved stereolithography system for generating a three-dimensional object by forming successive, adjacent, cross-sectional laminae of that object at the face of a fluid medium capable of altering its physical state in response to appropriate synergistic stimulation. More specifically, this invention is particularly directed to improved post processing techniques for fully curing a partially polymerized part produced by stereolithographic techniques.

The present invention is directed to a technology that harnesses the principles of computer generated graphics in combination with stereolithography, i.e., the application of lithographic techniques to the production of three-dimensional objects, to simultaneously execute computer aided design (CAD) and computer aided manufacturing (CAM) in producing three-dimensional objects directly from computer instructions. Post processing of such objects, in accordance with the invention, includes flood curing with the object immersed in water. The invention can be applied for the purposes of sculpturing models and prototypes in a design phase of product development, or as a manufacturing system, or even as a pure art form.

The new and improved stereolithographic system of the present invention has many advantages over currently used apparatus for producing plastic objects. The methods and apparatus of the present invention avoid the need of producing design layouts and drawings, and of producing tooling drawings and tooling. The designer can work directly with the computer and a stereolithographic device, and when he is satisfied with the design as displayed on the output screen of the computer, he can fabricate a part for direct examination. If the design has to be modified, it can be easily done through the computer, and then another part can be made to verify that the change was correct. If the design calls for several parts with interacting design parameters, the method of the invention becomes even more useful because all of the part designs can be quickly changed and made again so that the total assembly can be made and examined, repeatedly if necessary. Moreover, the data manipulation techniques of the present invention enable production of objects with reduced stress, curl and distortion, and increased resolution, strength, accuracy, speed and economy of production, even for difficult and complex object shapes.

After the design is complete, part production can begin immediately, so that the weeks and months between design and production are avoided. Stereolithography is particularly useful for short run production because the need for tooling is eliminated and production set-up time is minimal. Likewise, design changes and custom parts are easily provided using the technique. Because of the ease of making parts, stereolithography can allow plastic parts to be used in many places where metal or other material parts are now used. Moreover, it allows plastic models of objects to be quickly and economically provided, prior to the decision to make more expensive metal or other material parts.

Hence, the new and improved stereolithographic methods and apparatus of the present invention satisfy a long existing need for an improved CAD and CAM system capable of rapidly, reliably, accurately and economically designing and fabricating three-dimensional parts and the like, including improved post processing of such parts.

Referring now to the drawings, and particularly to FIG. 1 thereof, there is shown a block diagram of an overall stereolithography system suitable for practicing the present invention. A CAD generator 2 and appropriate interface 3 provide a data description of the object to be formed, typically in PHIGS format, via network communication such as ETHERNET or the like to an interface computer 4 where the object data is manipulated to optimize the data and provide output vectors which reduce stress, curl and distortion, and increase resolution, strength, accuracy, speed and economy of reproduction, even for rather difficult and complex object shapes. The interface computer 4 generates layer data by slicing, varying layer thickness, rounding polygon vertices, filling, generating flat skins, near-flat skins, up-facing and down-facing skins, scaling, cross-hatching, offsetting vectors and ordering of vectors.

The vector data and parameters from the computer 4 are directed to a controller subsystem 5 for operating the system stereolithography laser, mirrors, elevator and the like.

Figures 2, 3:
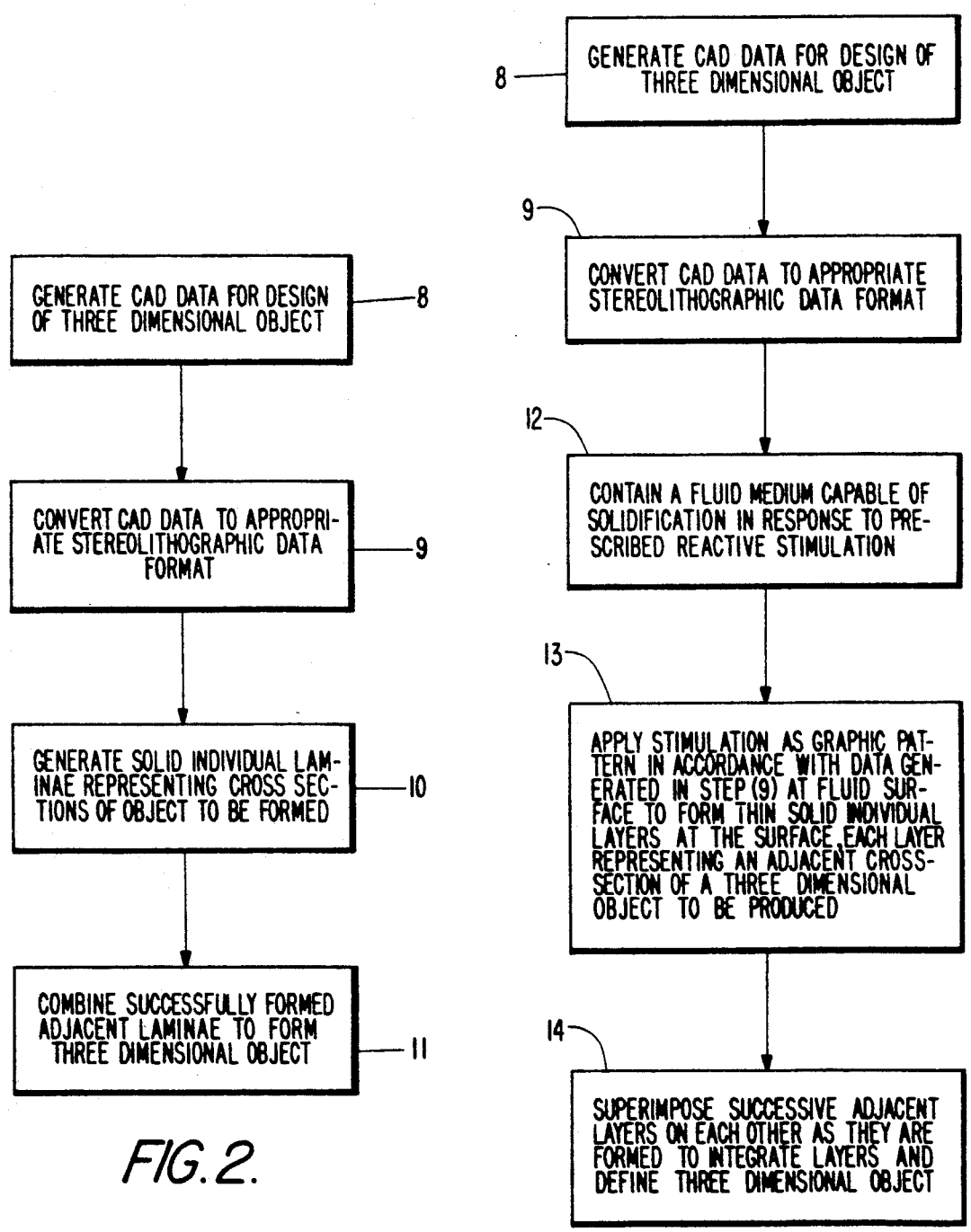
FIGS. 2 and 3 are flow charts illustrating the basic concepts employed in practicing the method of stereolithography of the present invention.

FIGS. 2 and 3 are flow charts illustrating the basic system of the present invention for generating three-dimensional objects by means of stereolithography.

Many liquid state chemicals are known which can be induced to change to solid state polymer plastic by irradiation with ultraviolet light (UV) or other forms of synergistic stimulation such as electron beams, visible or invisible light, reactive chemicals applied by ink jet or via a suitable mask. UV curable chemicals are currently used as ink for high speed printing, in processes of coating or paper and other materials, as adhesives, and in other specialty areas.

Lithography is the art of reproducing graphic objects, using various techniques. Modern examples include photographic reproduction, xerography, and microlithography, as is used in the production of microelectronics. Computer generated graphics displayed on a plotter or a cathode ray tube are also forms of lithography, where the image is a picture of a computer coded object.

Computer aided design (CAD) and computer aided manufacturing (CAM) are techniques that apply the abilities of computers to the processes of designing and manufacturing. A typical example of CAD is in the area of electronic printed circuit design, where a computer and plotter draw the design of a printed circuit board, given the design parameters as computer data input. A typical example of CAM is a numerically controlled milling machine, where a computer and a milling machine produce metal parts, given the proper programming instructions. Both CAD and CAM are important and are rapidly growing technologies.

A prime object of the technology relating to the present invention is to harness the principles of computer generated graphics, combined with UV curable plastic and the like, to simultaneously execute CAD and CAM, and to produce three-dimensional objects directly from computer instructions. This technology, referred to as stereolithography, can be used to sculpture models and prototypes in a design phase of products development, or as a manufacturing a device, or even as an art form. The present invention enhances the developments in stereolithography set forth in U.S. Pat. No. 4,575,330 issued Mar. 11, 1986, to Charles W. Hull, and which is fully incorporated by reference herein.

Referring now more specifically to FIG. 2 of the drawing, the stereolithographic method is broadly outlined. Step 8 calls for generation of CAD or other data, typically in digital form, representing a three-dimensional object to be formed by the system. This CAD data usually defines surfaces in polygon format, triangles, and normals perpendicular to the planes of those triangles, e.g., for slope indications, being presently preferred, and in a presently preferred embodiment of the invention conforms to the Programmer's Hierarchial Interactive Graphics System (PHIGS) now adopted as an ANSI standard. This standard is described, by way of example in the publication "Understanding PHIGS", published by Template, Megatek Corp., San Diego, Calif.

In Step 9, the PHIGS data or its equivalent is converted, in accordance with the invention, by a unique conversion system to a modified data base for driving the stereolithography output system in forming three-dimensional objects. In this regard, information defining the object is specially processed to reduce stress, curl and distortion, and increase resolution, strength and accuracy of reproduction.

Step 10 in FIG. 2 calls for the generation of individual solid laminae representing cross-sections of a three-dimensional object to be formed. Step 11 combines the successively formed adjacent laminae to form the desired three-dimensional object which has been programmed into the system for selective curing.

Hence, the stereolithographic system described herein generates three-dimensional objects by creating a cross-sectional pattern of the object to be formed at a selected surface of a fluid medium, e.g., a UV curable liquid or the like, capable of altering its physical state in response to appropriate synergistic stimulation such as impinging radiation, electron beam or other particle bombardment, or applied chemicals (as by ink jet or spraying over a mask adjacent the fluid surface), successive adjacent laminae, representing corresponding successive adjacent cross-sections of the object, being automatically formed and integrated together to provide a step-wise laminar or thin layer buildup of the object, whereby a three-dimensional object is formed and drawn from a substantially planar or sheet-like surface of the fluid medium during the forming process.

The aforedescribed technique illustrated in FIG. 2 is more specifically outlined in the flowchart of FIG. 3, where again Step 8 calls for generation of CAD or other data, typically in digital form, representing a three-dimensional object to be formed by the system. Again, in Step 9, the PHIGS data is converted by a unique conversion system to a modified data base for driving the stereolithography output system in forming three-dimensional objects. Step 12 calls for containing a fluid medium capable of solidification in response to prescribed reactive stimulation. Step 13 calls for application of that stimulation as a graphic pattern, in response to data output from the computer 4 in FIG. 1, at a designated fluid surface to form thin, solid, individual layers at that surface, each layer representing an adjacent cross-section of a three-dimensional object to be produced. In the practical application of the invention, each lamina will be a thin lamina, but thick enough to be adequately cohesive in forming the cross-section and adhering to the adjacent laminae defining other cross-sections of the object being formed.

Step 14 in FIG. 3 calls for superimposing successive adjacent layers or laminae on each other as they are formed, to integrate the various layers and define the desired three-dimensional object. In the normal practice of the invention, as the fluid medium cures and solid material forms to define one lamina, that lamina is moved away from the working surface of the fluid medium and the next lamina is formed in the new liquid which replaces the previously formed lamina, so that each successive lamina is superimposed and integral with (by virtue of the natural adhesive properties of the cured fluid medium) all of the other cross-sectional laminae. Of course, as previously indicated, the present invention also deals with the problems posed in transitioning between vertical and horizontal.

The process of producing such cross-sectional laminae is repeated over and over again until the entire three-dimensional object has been formed. The object is then removed and the system is ready to produce another object which may be identical to the previous object or may be an entirely new object formed by changing the program controlling, or the data supplied to, the stereolithographic system.

Figure 4:
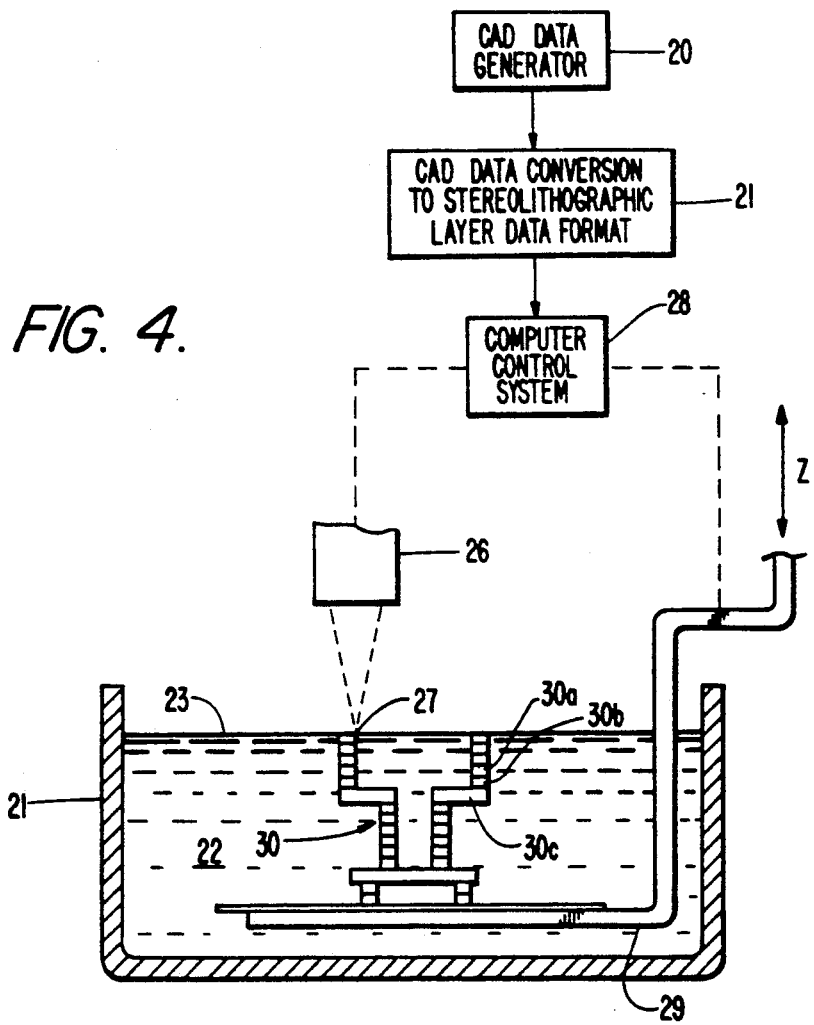
FIG. 4 is a combined block diagram schematic and elevational sectional view of a system suitable for practicing the invention.
Figure 5:
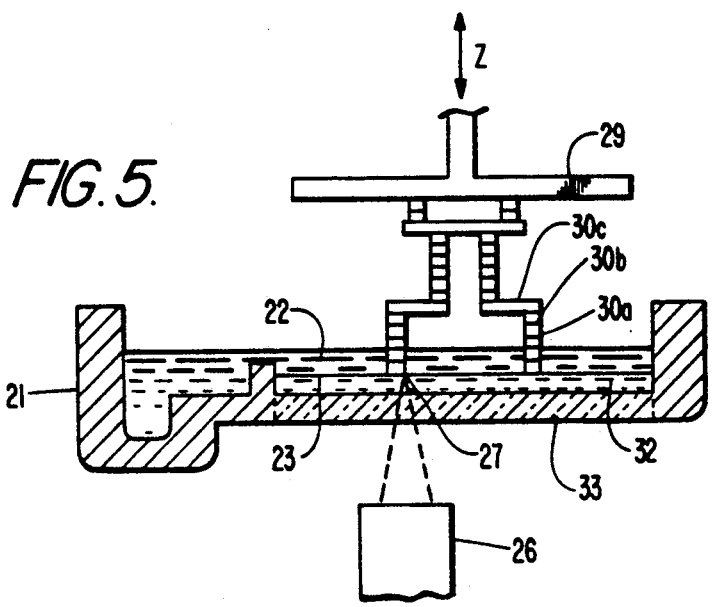
FIG. 5 is an elevational sectional view of a second embodiment of a stereolithography system for the practice of the invention.

FIGS. 4 and 5 of the drawings illustrate various apparatus suitable for implementing the stereolithographic methods illustrated and described by the systems and flow charts of FIGS. 1 through 3.

As previously indicated, "stereolithography" is a method and apparatus for making solid objects by successively "printing" thin layers of a curable material, e.g., a UV curable material, one on top of the other. A programmable movable spot beam of UV light shining on a surface or layer of UV curable liquid is used to form a solid cross-section of a given thickness of the object at the surface of the liquid. The object is then moved, in a programmed manner, away from the liquid surface by the thickness of one layer and the next cross-section is then formed and adhered to the immediately preceding layer defining the object. This process is continued until the entire object is formed.

Essentially all types of object forms can be created with the technique of the present invention. Complex forms are more easily created by using the functions of a computer to help generate the programmed commands and to then send the program signals to the stereolithographic object forming subsystem.

The data base of a CAD system can take several forms. One form, as previously indicated, consists of representing the surface of an object as a mesh of triangles (PHIGS). These triangles completely form the inner and outer surfaces of the object. This CAD representation also includes a unit length normal vector for each triangle. The normal points away from the solid which the triangle is bounding. This invention provides a means of processing such CAD data into the layer-by-layer vector data that is necessary for forming objects through stereolithography.

For stereolithography to successfully work, there must be good adhesion from one layer to the next. Hence, plastic from one layer must overlay plastic that was formed when the previous layer was built. In building models that are made of vertical segments, plastic that is formed on one layer will fall exactly on previously formed plastic from the preceding layer, and thereby provide good adhesion. As one starts to make a transition from vertical to horizontal features, using finite jumps in layer thickness, a point will eventually be reached where the plastic formed on one layer does not make contact with the plastic formed on the previous layer, and this causes severe adhesion problems. Horizontal surfaces themselves do not present adhesion problems because by being horizontal the whole section is built on one layer with side-to-side adhesion maintaining structural integrity. Therefore, means are provided for insuring adhesion between layers when making transitions from vertical to horizontal or horizontal to vertical sections, as well as providing a way to completely bound a surface, and ways to reduce or eliminate stress and strain in formed parts.

A presently-preferred embodiment of a new and improved stereolithographic system is shown in elevational cross-section in FIG. 4. A container 21 is filled with a UV curable liquid 22 or the like, to provide a designated working surface 23. A programmable source of ultraviolet light 26 or the like produces a spot of ultraviolet light 27 in the plane of surface 23. The spot 27 is movable across the surface 23 by the motion of mirrors or other optical or mechanical elements (not shown in FIG. 4) used with the light source 26. The position of the spot 27 on surface 23 is controlled by a computer control system 28. As previously indicated, the system 28 may be under control of CAD data produced by a generator 20 in a CAD design system or the like and directed in PHIGS format or its equivalent to a computerized conversion system 25 where information defining the object is specially processed to reduce stress, curl and distortion, and increase resolution, strength and accuracy of reproduction.

A movable elevator platform 29 inside container 21 can be moved up and down selectively, the position of the platform being controlled by the system 28. As the device operates, it produces a three-dimensional object 30 by step-wise build-up of integrated laminae such as 30a, 30b, 30c.

The surface of the UV curable liquid 22 is maintained at a constant level in the container 21, and the spot of UV light 27, or other suitable form of reactive stimulation, of sufficient intensity to partially polymerize the liquid resin, such that it is converted to a solid material, is moved across the working surface 23 in a programmed manner. As the liquid 22 cures and solid material forms, the elevator platform 29 that was initially just below surface 23 is moved down from the surface in a programmed manner by any suitable actuator. In this way, the solid material that was initially formed is taken below surface 23 and new liquid 22 flows across the surface 23. A portion of this new liquid is, in turn, converted to solid material by the programmed UV light spot 27, and the new material adhesively connects to the material below it. This process is continued until the entire three-dimensional object 30 is formed. The object 30 is then removed from the container 21, and the apparatus is ready to produce another object. Another object can then be produced, or some new object can be made by changing the program for, or the data supplied to, the computer 28.

The curable liquid 22, e.g., the UV curable resin, should have several important properties. First, it must cure fast enough with the available UV light source to allow practical object formation times. Additionally, it should be adhesive, so that successive layers will adhere to each other. Further, its viscosity should be low enough so that fresh liquid material will quickly flow across the surface when the elevator moves the object. Moreover, it should absorb UV so that the film formed will be reasonably thin. It will preferably also be reasonably insoluble in solid state, so that the object can be washed free of excess resin after the object has been formed. Finally, it should be as non-toxic and non-irritating as possible.

The cured material should also have properties that will depend on the application involved, as in the conventional use of other plastic materials. Such parameters as color, texture, strength, electrical properties, flammability, and flexibility are among the properties to be considered. In addition, the cost of the material will be important in many cases.

The UV curable material used in the presently preferred embodiment of a working stereolithography (e.g., FIG. 3) is DeSoto SLR 800 stereolithography resin, made by DeSoto, Inc., of Des Plaines, Ill. Other low distortion resins are available or becoming available from other major chemical companies, such as Ciba- Geigy. Acrylate and methacrylate resins are generally useful. Typical such resins comprise a photoinitiator (e.g., about 4%), as well as, for example, one or more of a urethane acrylate oligomer (e.g., about 25%), an epoxy resin diacrylate (e.g., about 25%), a trimethacrylate ester (e.g., about 15%), a propoxylated diacrylate ester (e.g., about 15%), and a diluent acrylate monomer (e.g., about 20%). The foregoing percentages are given by way of illustration only, to exemplify a typical resin, but are not intended as limiting. Other optional ingredients include various oligomers and an ethoxylated diacrylate ester. Typical viscosities at 25 degrees C. range from about 100 to about 3,500 centipoises.

The light source 26 produces the spot 27 of UV light small enough to allow the desired object detail to be formed, and intense enough to cure the UV curable liquid being used quickly enough to be practical. The source 26 is arranged so it can be programmed to be turned off and on, and to move, such that the focused spot 27 moves across the surface 23 of the liquid 22. Thus, as the spot 27 moves, it cures the liquid 22 into a solid, and "draws" a solid pattern on the surface in much the same way a chart recorder or plotter uses a pen to draw a pattern on paper.

The light source 26 for the presently-preferred embodiment of a stereolithography apparatus is typically a helium-cadmium ultraviolet laser such as the Model 4240N HeCd Multimode Laser, made by Liconix of Sunnyvale, Calif.

In the system of FIG. 4, means may be provided to keep the surface 23 at a constant level and to replenish this material after an object has been removed so that the focused spot 27 will remain sharply in focus on a fixed focus plane, thus insuring maximum resolution in forming a layer on this plane. This makes it possible to provide a region of high intensity right at the working surface 23, rapidly diverging to low intensity and thereby limiting the depth of the curing process to provide the thinnest appropriate cross-sectional laminae for the object being formed. Other reasons for maintaining the surface 23 at a constant level may include the ability to maintain a constant layer thickness and the ability to maintain accuracy in the stereolithographic process.

The elevator platform 29 is used to support and hold the object 30 being formed, and to move it up and down as required. Typically, after a layer is formed, the object 30 is moved beyond the level of the next layer to allow the liquid 22 to flow into the momentary void at surface 23 left where the solid was formed, and then it is moved back to the correct level for the next layer. The requirements for the elevator platform 29 are that it can be moved in a programmed fashion at appropriate speeds, with adequate precision, and that it is powerful enough to handle the weight of the object 30 being formed. In addition, a manual fine adjustment of the elevator platform position is useful during the set-up phase and when the object is being removed. The elevator platform 29 can have mechanical, pneumatic, hydraulic, or electrical and may also be optical or electronic feedback to precisely control its position. The elevator platform 29 is typically fabricated of either glass or aluminum, but any material to which the cured plastic material will adhere is suitable.

A computer controlled pump (not shown) may be used to maintain a constant level of the liquid 22 at the working surface 23. Appropriate level detection system and feedback networks, well known in the art, can be used to drive a fluid pump or a liquid displacement device, such as a solid rod (not shown) which is moved out of the fluid medium as the elevator platform is moved further into the fluid medium, to offset changes in fluid volume and maintain constant fluid level at the surface 23. Alternatively, the source 26 can be moved relative to the sensed level 23 to maintain the same distance between the source 26 and the surface 23. All of these alternatives can be readily achieved by appropriate data operating in conjunction with the computer control system 28. Another method of controlling liquid level is to use a spillway over which resin can flow if the liquid level rises.

After the three-dimensional object 30 has been formed, the elevator platform 29 is raised and the object is removed from the platform for post processing.

In addition, there may be several containers 21 used in the practice of the invention, each container having a different type of curable material that can be automatically selected by the stereolithographic system, in this regard, the various materials might provide plastics of different colors, or have both insulating and conducting material available for the various layers of electronic products.

As will be apparent from FIG. 5 of the drawings, there is shown an alternate configuration of a stereolithographic apparatus wherein the UV curable liquid 22 or the like floats on a heavier UV transparent liquid 32 which is non-miscible and non-wetting with the curable liquid 22. By way of example, ethylene glycol or heavy water are suitable for the intermediate liquid layer 32. In the system of FIG. 5, the three-dimensional object 30 is pulled up from the liquid 22, rather than down and further into the liquid medium, as shown in the system of FIG. 4.

The UV light source 26 in FIG. 5 focuses the spot 27 at the interface between the liquid 22 and the non-miscible intermediate liquid layer 32, the UV radiation passing through a suitable UV transparent window 33, of quartz or the like, supported at the bottom of the container 21. The curable liquid 22 is provided in a very thin layer over the non-miscible layer 32 and thereby has the advantage of limiting layer thickness directly rather than relying solely upon absorption and the like to limit the depth of curing since ideally an ultrathin lamina is to be provided. Hence, the region of formation will be more sharply defined and some surfaces will be formed smoother with the system of FIG. 5 than with that of FIG. 4. In addition a smaller volume of UV curable liquid 22 is required, and the substitution of one curable material for another is easier.

A commercial stereolithography system will have additional components and subsystems besides those previously shown in connection with the schematically depicted systems of FIGS. 1-5. For example, the commercial system would also have a frame and housing, and a control panel. It should have means to shield the operator from excess UV and visible light, and it may also have means to allow viewing of the object 30 while it is being formed. Commercial units will provide safety means for controlling ozone and noxious fumes, as well as conventional high voltage safety protection and interlocks. Such commercial units will also have means to effectively shield the sensitive electronics from electronic noise sources.

A key feature of the present invention, in improving the quality of parts produced stereolithography, resides in the post processing of such parts and, more particularly, in irradiating such parts with ultraviolet radiation (UV) or the like while the part is immersed in water. For the purposes of this invention, a "part" is to be broadly construed as any object or item that can be post processed according to the methods described herein, irrespective of whether the part is a whole article or a portion of an article. A typical post processing procedure includes the following steps:

1) Raising the part out of the vat of resin.
2) Allowing the part to drain into the vat (e.g., from about 10 minutes to about an hour).
3) Removing the part (and platform, if desired) from the stereolithography unit (SLA) and placing it on an absorbent pad.
4) Optionally placing the part/platform in a low temperature oven (heated to a temperature between room temperature and a temperature effective for thermally curing the resin, e.g., from room temperature to about 100 degrees C., and preferably from about 60 to about 90 degrees C.).
5) Optionally removing excess resin with cotton swabs.
6) Optionally coating the part surface with resin to give good surface finish.
7) Optionally giving the part a quick exposure of flood UV (or other radiation as appropriate for the photoinitiator) to set the surface.
8) In accordance with the invention, immersing the part in cool water, such that the water fills all cavities in the part, if possible.
9) Applying flood UV (or other radiation as appropriate for the photoinitiator) to the part, while it is under water (or another appropriate liquid medium).
10) Optionally rotating the part as necessary to provide a uniform cure.
11) Removing the part from the platform, if necessary.
12) Repeating steps 6-10, if necessary.

Figure 6:
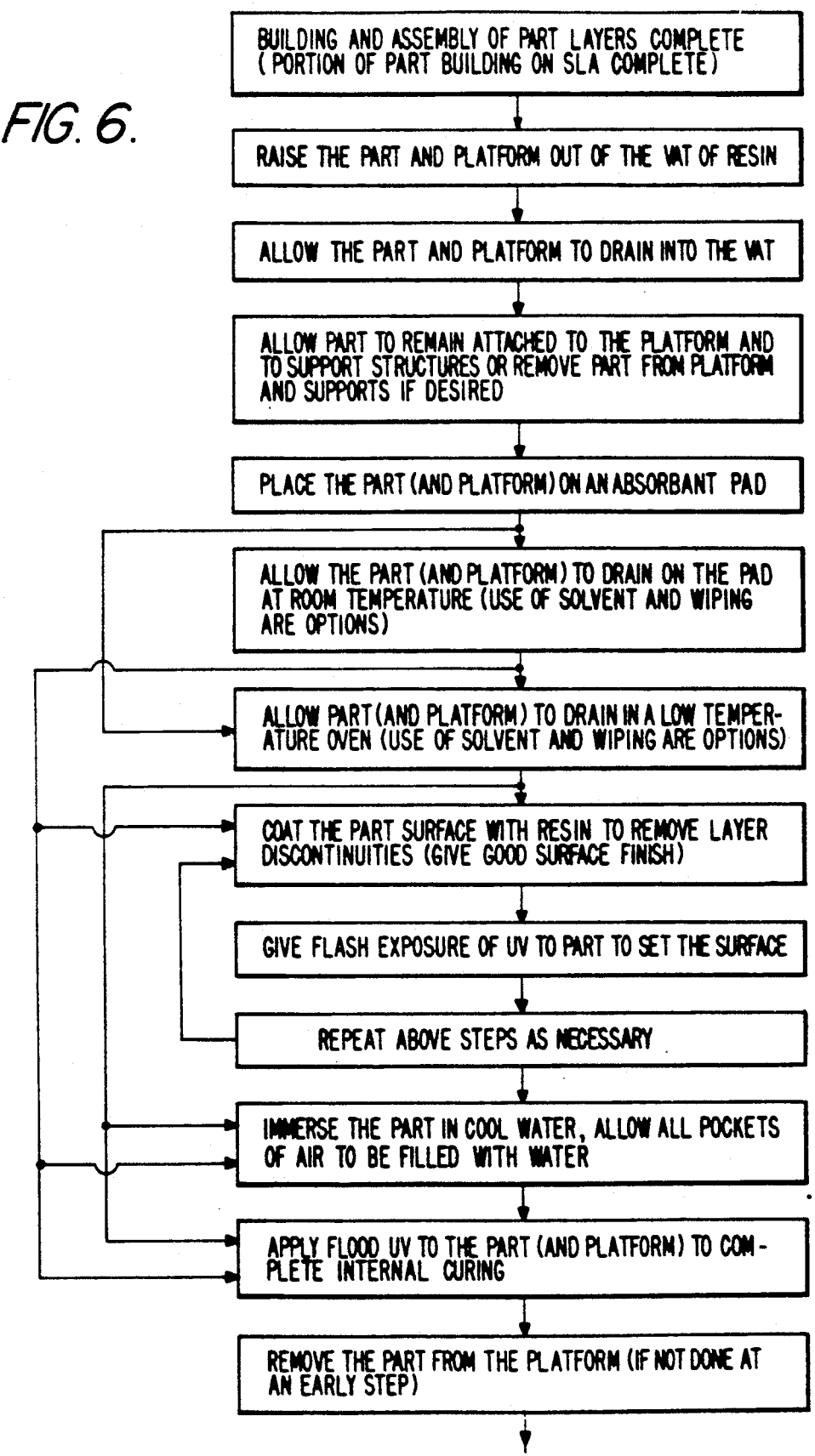
FIG. 6 is a flow chart illustrating post processing steps in practicing the method of stereolithography of the present invention.
Figure 6:
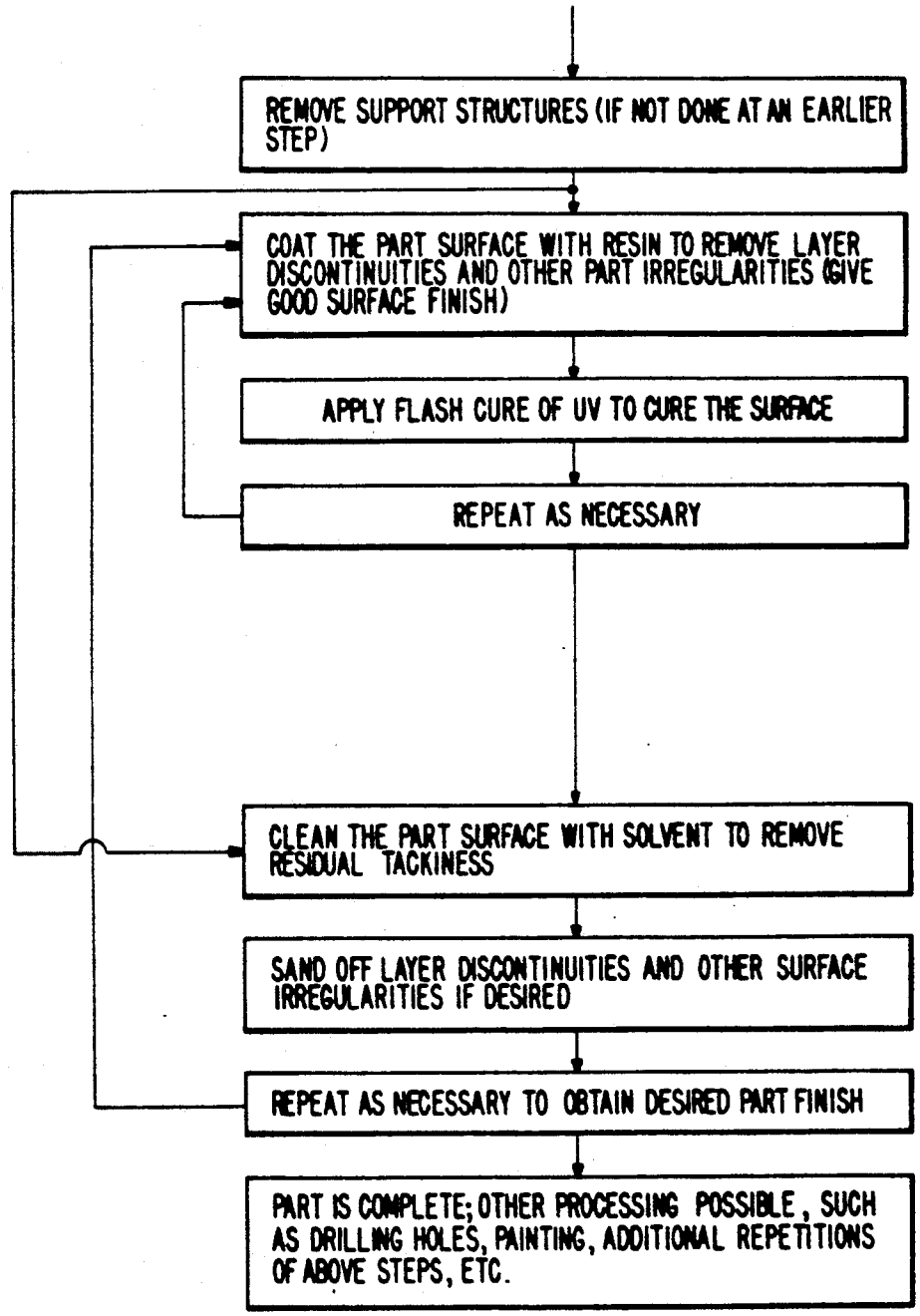

The post processing steps are set forth in more detail in FIG. 6, along with process arrows indicating various options for selection and ordering of the steps.

Step 8 is of particular interest herein. By this point in the process, the partially polymerized part was drained and optionally further polymerized at the surface—flash flooded with UV light or otherwise irradiated, such as with other forms of electromagnetic radiation (e.g., visible light), or with particle beams, such as electron beams, depending upon the nature of the photoinitiator and the resin; or otherwise chemically reacted or catalyzed—to set the surface to the extent that it is impervious to water. According to Step 8, the part is immersed in water, or another liquid medium such as a salt solution, a fluorocarbon such as trichlorotrifluoroethane, an organic solvent, such as polyethylene glycol telomers or ethanol, etc., during a flood UV exposure (or exposure to other radiation, chemical reaction, or catalysis as described above, depending upon the nature of the photoinitiator, the resin, and the liquid medium) of sufficient duration to completely cure the part. The liquid medium preferably has a similar specific gravity to the partially polymerized part, to provide an optimum level of buoyancy, such that distortion risks due to gravity are minimized; preferably absorbs heat away from the part that is generated during the polymerization reaction; and preferably acts as a heat exchanger by transmitting the heat from the part without a pronounced increase in the temperature of the liquid medium itself. Preferably, the water and the part are at ambient temperature when the part is immersed in the water; e.g., the water is generally between about 15 and about 35 degrees C., although it can vary depending upon the nature of the resin, and is preferably about 20 to about 30 degrees C., and most preferably about 25 degrees C. Ideally, the water temperature is maintained at a selected level, typically within plus or minus about 5 degrees C., preferably within plus or minus about 3 degrees C., and most preferably maintained within about a degree C. There needs to be sufficient water to constitute a large enough thermal mass such that its temperature does not change dramatically during exposure to radiation from the lamps during the curing process. Optionally, the water can be recycled through a heat exchanger to maintain it substantially at room temperature and to reduce the quantity of water required.

In one embodiment of the invention, the water is filtered to remove substantially all impurities that would affect UV absorption (or absorption of whatever other form of radiation is used to cure the part), and preferably the water is maintained in a substantially pure state. Any of several standard filtering techniques are acceptable for this purpose, such as, for example, deionization, passage over charcoal, distillation, or pumping through a fine screen. Alternatively, the water can be changed between curing successive parts, or as often as necessary.

In another embodiment, the UV light (or other radiation) is screened to remove particular UV (or other) wavelengths or to alter the distribution of UV (or other) wavelengths by screening means such as, for example, chemical absorbers (including but not limited to photoabsorbers or photoinitiators), glass filters, and/or diffraction apparatus such as gratings or prisms. This screening can change the polymerization characteristics of the part during the curing process, and can reduce or eliminate warpage due to differential curing through the part. More specifically, if radiation at peak absorption wavelengths can be removed or diminished, then radiation absorbed at nearby wavelengths (i.e., radiation that is absorbed, but less readily absorbed by the photoinitiator in the resin than at peak wavelengths), can lead to more uniform curing. For example, a second initiator—having the same or an overlapping absorption spectrum (shifted towards shorter wavelengths) to the first initiator used for catalyzing the photopolymerization reaction in the part being cured—can be added to the water to absorb a portion of light at the absorbance peak of the first initiator. If desired, the same initiator can be used in the resin and in the water. In this manner, the polymerization reaction is largely catalyzed by light off the peak wavelengths, such that the polymerization reaction occurs in a more diffuse manner in the part being cured, rather than occurring preponderantly at the surface.

Figure 7:
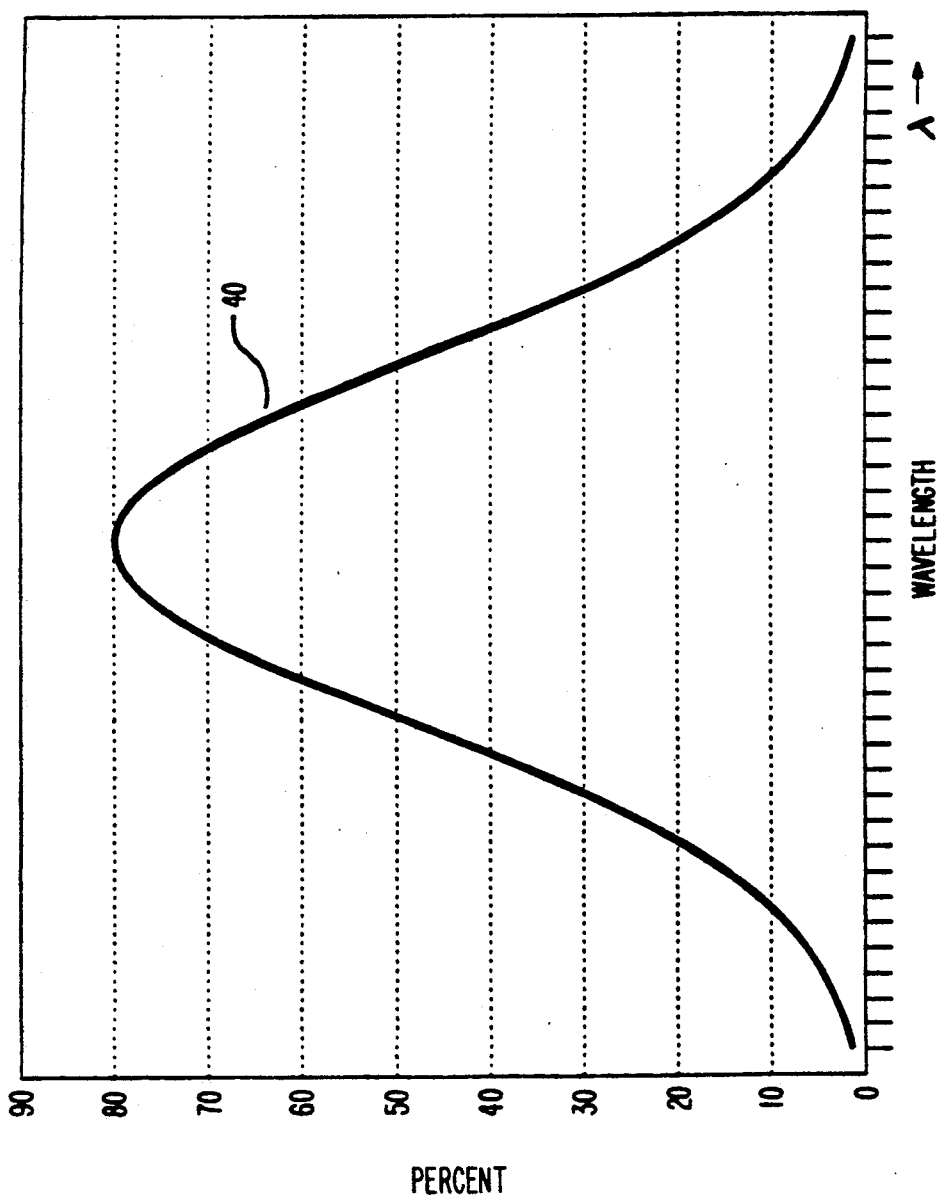
FIGS. 7, 8 and 9 are graphs depicting a screening technique of the present invention, that helps to provide uniform curing.
Figure 8:
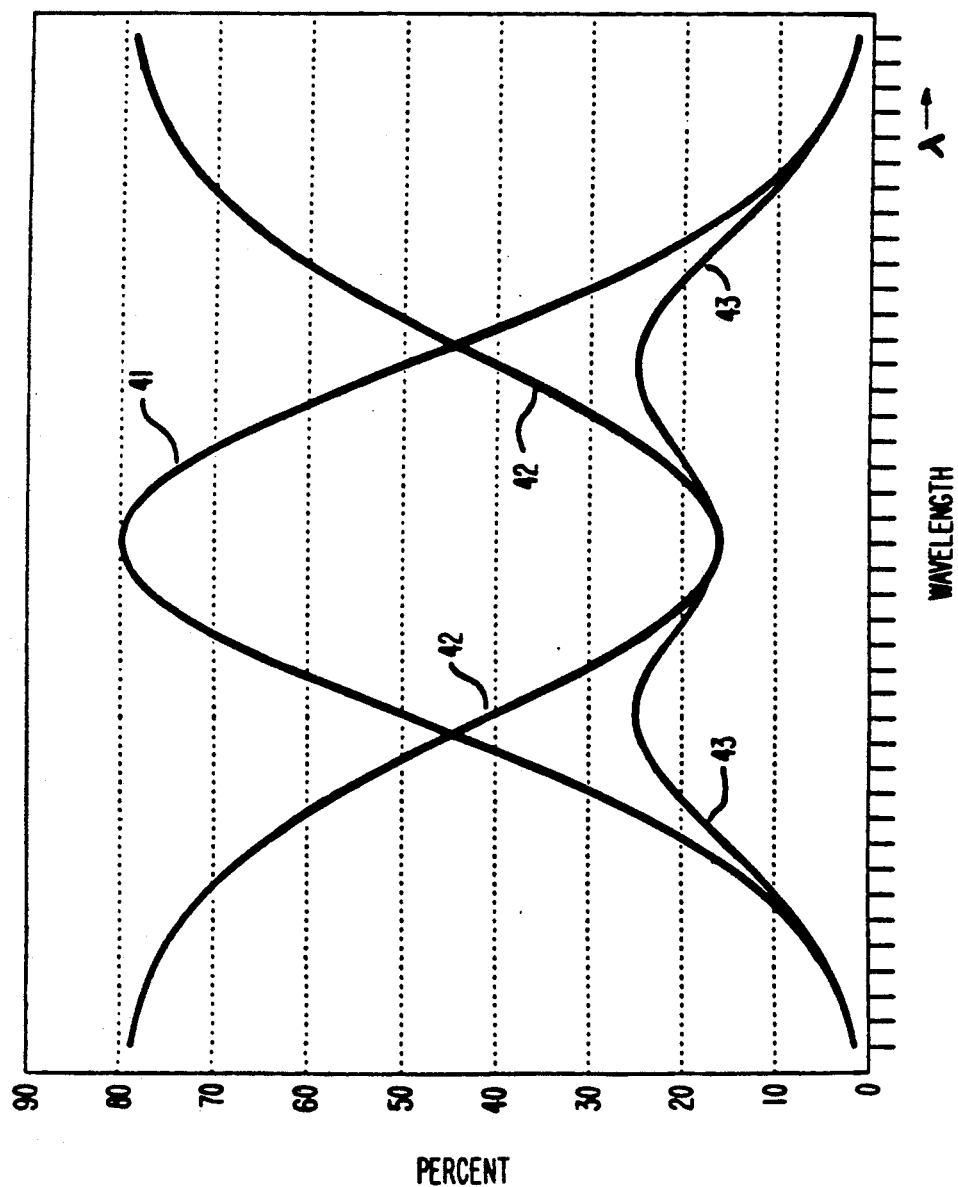
Figure 9:
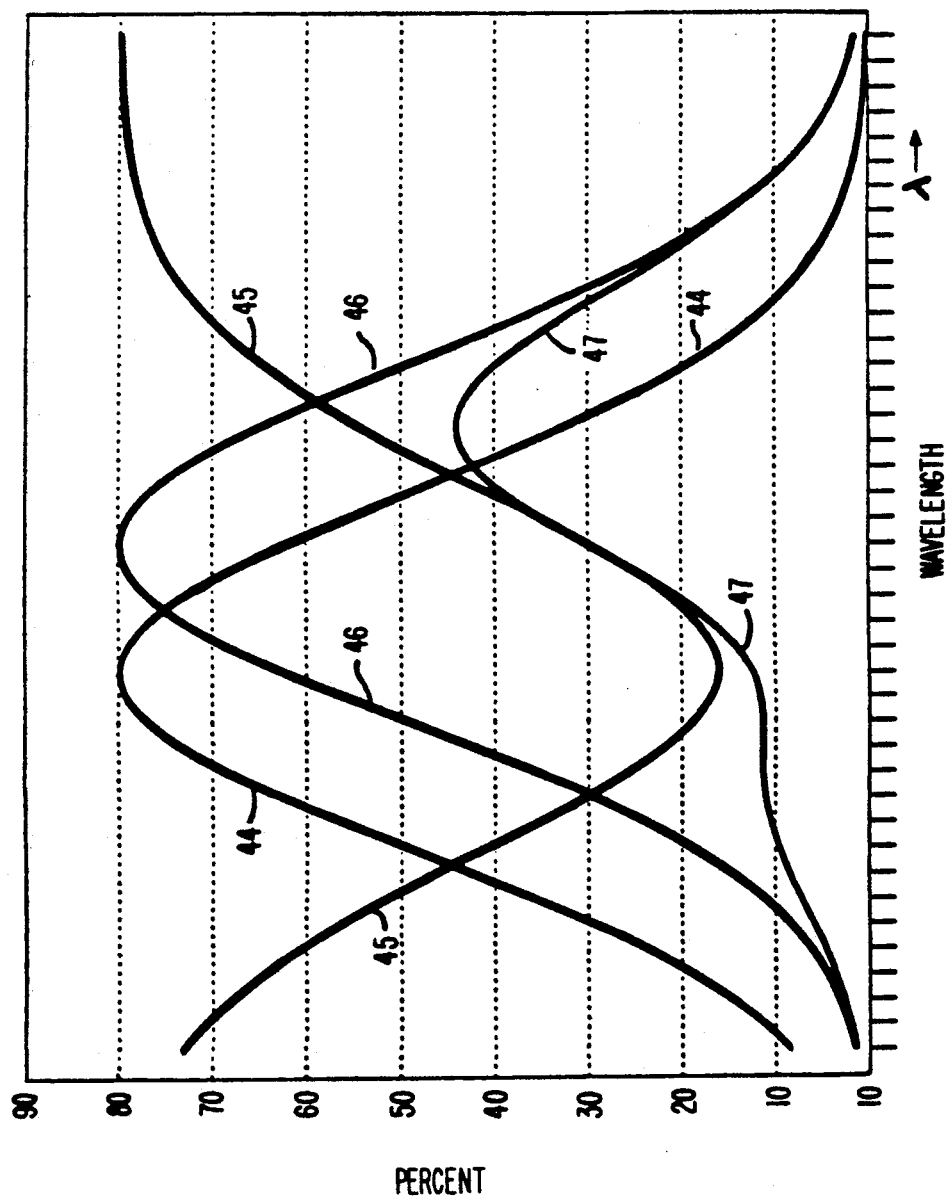

FIGS. 7, 8 and 9 illustrate the principle of screening some or all of the peak absorbance wavelengths of the photoinitiator to obtain a more uniform cure through the part. This principle can be applied to almost any means for activating the photoinitiator, although here the principle is illustrated with reference to absorption of light. Based on their absorbance spectra, photoinitiators respond to different wavelengths of light by allowing some to penetrate more deeply into the part before being absorbed. In general, light at the peak wavelengths of the spectra will tend to be absorbed rapidly and therefore rapidly activate the photoinitiator at or near the surface of the part, while light off the peak wavelengths will tend to penetrate more deeply before being absorbed and therefore activating the photoinitiator.

In FIG. 7, curve 40 represents the percent absorbance spectrum for a typical photoinitiator in a resin. If the photoinitiator responds, for example, to light in the ultraviolet region, and if the liquid medium surrounding the part is water, it can be assumed that the absorption of light by the photoinitiator in the part substantially matches the absorbance spectrum of the photoinitiator, since little or no light is attenuated by the passage through water. Assuming, for example, that an approximately equal continuum of energy is supplied at each wavelength by the irradiating source, the majority of the cure will be catalyzed by photoinitiator responding to the radiation at the peak wavelength of its absorbance curve. The result will tend to be a relatively shallow cure, and as the cure progresses it will tend to do so in a shallow, layer-by-layer fashion, such that warpage of the part could result.

In FIG. 8, curve 41 represents the percent absorbance spectrum for a typical photoinitiator suspended in a liquid medium such as water, and curve 42 represents the percent transmission of light through the suspended photoinitiator. Accordingly, curve 43 represents the percent absorption of light by the photoinitiator in resin, based on the availability of light that was transmitted through the water containing suspended photoinitiator. In this example, the photoinitiator in the resin is the same one as in the water, although their concentrations may differ. As can be seen from the Figure, more absorption, and therefore, more polymerization, occurs at wavelengths displaced from the peak of the absorbance of the initiator. This results in a cure that extends more deeply into the part, such that a more uniform cure is obtained than would be obtained in the absence of the suspended photoinitiator.

In FIG. 9, curve 44 represents the percent absorbance spectrum for a first typical photoinitiator suspended in a liquid medium such as water, curve 45 represents the percent transmission of light to the part through the suspended photoinitiator, curve 46 represents the percent absorbance spectrum for a second typical photoinitiator, suspended in a resin, and curve 47 represents the percent absorption of light by the second typical photoinitiator in the part, in the presence of the suspended first photoinitiator, based upon the available light transmitted to the part. Accordingly, this Figure depicts different photoinitiators in the water and in the resin, such that the available light for curing the resin (partially polymerized part) is shifted towards longer wavelengths, resulting in a deeper and more uniform cure of the part.

Figure 10:
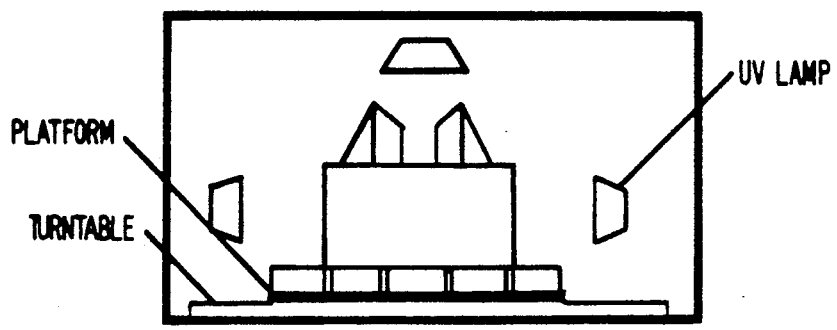
FIG. 10 is a schematic illustration of a preferred manner in which to carry out the flood UV curing step of the present invention.

Curing is carried out in a vessel transparent to UV light, such as a quartz or pyrex container, and should be carried out with the UV light striking the entire surface of the part as uniformly as possible. This can be accomplished, for example, by using multiple lamps simultaneously from different angles, by using high quality reflectors to distribute the light around the object, by rotating the object or the lamps, or the like. The foregoing techniques can be used individually or in combination. FIG. 10 illustrates a typical arrangement for flood curing. Most preferably, the vessel is placed in a 3D Systems PCA (Post Cure Apparatus), obtainable from 3D Systems, Inc., Sylmar, Calif. This is an oven-like chamber having a plurality of ultraviolet lamps disposed therein, reflecting panels on all inside surfaces, and a rotatable base disposed on the bottom inside surface. Of course, other suitable means for curing the part may be used.

Preferably, in generating the UV light for curing, a high pressure mercury discharge lamp or a metal halide lamp, such as, for example, Philips' (Belgium) HPA 400S "Mercury Vapor Burner," is used. The UV lamp used to flood the surface is typically of mixed wavelengths in the 250 to 750 nm range, with the majority of the output being in peaks and continuum in the range of 300 to 400 nm, i.e., the long-ultraviolet range. This lamp is suitable for use with the photoinitiator in the preferred SLR 800 resin obtained from DeSoto, Inc., Des Plaines, Ill., as the radiation emitted by the lamp encompasses the absorption spectrum of said photoinitiator. Preferably, using the SLR 800 resin or other resins curable in the long UV range, the intensity of the light striking the surface of the part is about 20 mW per square cm to about 100 mW per square cm in the 300 to 400 nm range. The cure time will typically range from about 7 to about 15 minutes, although one of ordinary skill in the art will routinely be able to vary it as needed depending upon the conditions required by the nature of the photoinitiator, the activating irradiation, the resin, and the liquid medium. Although these conditions are typically useful for the initiator in the preferred SLR 800 resin, it will be apparent to one of ordinary skill in the art that other resins may be suited to cure at other wavelengths and conditions. These exemplary conditions are suitable for use with the lamp stabilized at maximum power, and, accordingly, the times required for curing will need to be increased if the lamps have not attained maximum power before flooding.

Preferred resins are acrylate and methacrylate resins containing a small percentage of photoinitiator (e.g., less than about 5% and typically about 4% photoinitiator) having an absorption spectrum in the long ultraviolet range, such as the SLR 800 resin.

Curing the part while it is immersed in water provides several important advantages. First, the part is maintained at a relatively uniform temperature during the polymerization process. It has been found that temperature changes of a part during post processing steps can lead to distortion of the part. The water conducts the heat away from the part as the exothermic chemical polymerization reaction progresses. Water also absorbs the infrared radiation emitted by the UV lamps, thereby keeping it from being absorbed by the part with attendant risks of heat-induced deformation.

Moreover, oxygen inhibits the polymerization process, which effect is particularly pronounced at the surfaces of the part being cured, such that the surfaces tend to retain a certain tackiness. Curing the part under water displaces the oxygen from the surface, improves the surface characteristics, and provides a more efficient surface cure.

Yet another advantage provided by the present invention is that the water supports the weight of the part, and accordingly minimizes risk of distortion due to gravitational forces.

The new and improved stereolithographic method and apparatus has many advantages over currently used methods for producing plastic objects. The method avoids the need of producing tooling and tooling drawings. The designer can work directly with the computer and a stereolithographic device. When the designer is satisfied with the design as displayed on the output screen of the computer, the designer can fabricate a part for direct examination, with information defining the object being specially processed to reduce curl and distortion, to increase resolution, and strength and accuracy of reproduction. If the design has to be modified as determined by examination of the plastic, three-dimensional part, it can be easily done through the computer, and then another part can be made to verify that the change was correct. If the design calls for several parts with interacting design parameters, the method becomes even more useful because all of the part designs can be quickly changed and made again so that the total assembly can be made and examined, repeatedly if necessary.

After the design is complete, part production can begin immediately, so that the usual weeks and months between design and production are avoided. Ultimate production rates and parts costs should be similar to current injection molding costs for short run production, with even lower labor costs than those associated with injection molding. Injection molding is typically economical only when large numbers of identical parts are required. Stereolithography is particularly useful for short run production because the need for tooling is eliminated and production set-up time is minimal. Likewise, design changes and custom parts are easily provided using the technique. Because of the ease of making parts, stereolithography can allow plastic parts to be used in many places where metal or other material parts are now used. Moreover, it allows plastic models of objects to be quickly and economically provided, prior to the decision to make more expensive metal or other material parts.

The present invention satisfies a long existing need in the art for a CAD and CAM system capable of rapidly, reliably, accurately and economically designing and fabricating three-dimensional plastic parts and the like and in providing enhanced post curing.

It will be apparent from the foregoing that, while particular forms of the invention have been illustrated and described, various modifications can be made without departing from the spirit and scope of the invention. Accordingly, it is not intended that the invention be limited, except as by the appended claims.

What is claimed is:

1. A method for curing a stereolithographically-produced, partially polymerized part comprising a material that absorbs reactive electromagnetic radiation most strongly at peak-absorptive wavelengths and less strongly at off-peak absorptive wavelengths, comprising the steps of:
providing a source of electromagnetic radiation, including both peak-absorptive and off-peak absorptive wavelengths, for curing said part; and
exposing said part to electromagnetic radiation while substantially screening the electromagnetic radiation at the peak-absorptive wavelengths, thereby curing the part with primarily off-peak absorptive wavelengths.

2. The method of claim 1 further comprising the step of immersing the part in water, wherein the screening is carried out by adding photoinitiator to the water.

3. The method of claim 1 further comprising the steps of immersing the part in water and maintaining the water in a substantially pure state.

4. The method of claim 1 further comprising providing an electromagnetic screen between the source of electromagnetic radiation and the part.

5. The method of claim 3 further comprising maintaining the water at a preselected temperature.

6. The method of claim 1 wherein said providing step comprises providing said source of electromagnetic radiation which is ultraviolet radiation, and said screening step comprises substantially screening the ultraviolet radiation at the peak-absorptive wavelengths.

7. The method of claim 6 further comprising the step of immersing the part in water, wherein the screening step comprises adding photoinitiator to the water.

8. The method of claim 7 further comprising the step of maintaining the water in a substantially pure state.

9. The method of claim 6 wherein the screening step comprises providing an electromagnetic screen between said source and the part.

10. The method of claim 7 further comprising the step of substantially maintaining the water at a preselected temperature.

11. A method for curing a stereolithographically-produced, partially polymerized part comprising a material that absorbs reactive electromagnetic radiation most strongly at peak-absorptive wavelengths and less strongly at off-peak absorptive wavelengths to further polymerize said part, comprising the steps of:
submerging the part in a liquid medium;
adding an absorbing substance, which absorbs electromagnetic radiation at peak-absorptive wavelengths more strongly than at off-peak absorptive wavelengths, to the liquid medium; and
exposing said part to electromagnetic radiation while said part is still submerged in said liquid medium, thereby curing the part with primarily off-peak absorptive wavelengths.

12. The method of claim 11 wherein said adding step comprises adding photoinitiator to the liquid medium.

13. The method of claim 11 wherein said adding step comprises adding said substance which is said photoinitiator to the liquid medium.

14. A method for curing a stereolithographically-produced, partially polymerized part comprising a material that absorbs reactive electromagnetic radiation most strongly at peak-absorptive wavelengths and less strongly at off-peak absorptive wavelengths to further polymerize said part, comprising the steps of:
exposing said part to electromagnetic radiation from a source; and
placing a screen, which filters peak-absorptive wavelengths more strongly than off-peak absorptive wavelengths from the electromagnetic radiation, between the part and said source of electromagnetic radiation, thereby curing the part primarily with off-peak absorptive wavelengths.

* * * * *